United States Patent
Pelteshki et al.

(10) Patent No.: US 8,731,041 B2
(45) Date of Patent: May 20, 2014

(54) PARALLEL CLOSED-LOOP DFE FILTER ARCHITECTURE

(75) Inventors: Anton Pelteshki, Carleton Place (CA); John Hogeboom, Ottawa (CA)

(73) Assignee: STMicroelectronics (Canada) Inc., Ottawa (CA)

( * ) Notice: Subject to any disclaimer, the term of this patent is extended or adjusted under 35 U.S.C. 154(b) by 10 days.

(21) Appl. No.: 13/450,265

(22) Filed: Apr. 18, 2012

(65) Prior Publication Data

US 2012/0269255 A1 Oct. 25, 2012

Related U.S. Application Data

(60) Provisional application No. 61/477,987, filed on Apr. 21, 2011.

(51) Int. Cl.
*H03H 7/30* (2006.01)

(52) U.S. Cl.
USPC ............................................. 375/233

(58) Field of Classification Search
USPC ............................................. 375/233
See application file for complete search history.

(56) References Cited

U.S. PATENT DOCUMENTS

| | | | | |
|---|---|---|---|---|
| 2004/0258183 | A1* | 12/2004 | Popescu et al. | 375/350 |
| 2007/0147559 | A1* | 6/2007 | Lapointe | 375/350 |
| 2010/0098147 | A1* | 4/2010 | Miller | 375/233 |
| 2010/0202506 | A1* | 8/2010 | Bulzacchelli et al. | 375/233 |
| 2012/0027073 | A1* | 2/2012 | Abel et al. | 375/233 |

* cited by examiner

*Primary Examiner* — Leon-Viet Nguyen
(74) *Attorney, Agent, or Firm* — Hogan Lovells US LLP

(57) ABSTRACT

A DFE filter includes an input, a first filter loop coupled to the input for providing an odd bit-stream, and a second filter loop coupled to the input for providing an even bit-stream, wherein the first and second filter loops are identical and interleaved.

19 Claims, 5 Drawing Sheets

PARALLEL CLOSED-LOOP DFE FILTER ARCHITECTURE

RELATED APPLICATION

The present invention claims priority from U.S. Provisional Patent Application Ser. No. 61/477,987 filed Apr. 21, 2011, and is incorporated herein by reference in its entirety for all purposes as if fully set forth herein.

FIELD OF THE INVENTION

The present invention relates to Decision Feedback Equalizer ("DFE") filters.

BACKGROUND OF THE INVENTION

A Serializer/Deserializer circuit (SerDes) includes functional blocks that are commonly used in high speed communications to compensate for limited inputs/outputs. These blocks convert data between serial data and parallel interfaces in each direction. The term "SerDes" generically refers to interfaces used in various technologies and applications as is known in the art. The SerDes RX front-end circuitry must ultimately accurately capture the data content in the input signal, but before this can be done the SerDes must insure that voltage offset is compensated, linear equalization is applied for basic line loss increase versus signal component frequency, and Decision Feedback Equalization is applied to compensate for non-generic properties. Such non-generic properties are mostly caused by local signal reflections from any significant physical discontinuities in the transmission media, in particular PCB vias, and the package-die interface and its associated vias.

While DFE filters are known in the art, the upper operating frequency of these filters is constantly being challenged by technological demands. What is desired, therefore, is a DFE filter that is capable of a frequency operating range beyond that which is currently achievable without unnecessarily increasing component count or cost.

SUMMARY OF THE INVENTION

According to the present invention, a DFE filter comprises an input, a first filter loop coupled to the input for providing an odd bit-stream, and a second filter loop coupled to the input for providing an even bit-stream, wherein the first and second filter loops are substantially identical. The first filter loop comprises a summer, a first latch circuit coupled to the summer for providing the odd bit-stream, a second latch circuit for receiving the odd bit-stream, and a delay circuit coupled between the second latch circuit and the summer. The first filter loop further comprises a linear buffer and a limiting amplifier. The second filter loop comprises a summer, a first latch circuit coupled to the summer for providing the even bit-stream, a second latch circuit for receiving the even bit-stream, and a delay circuit coupled between the second latch circuit and the summer. The second filter loop further comprises a linear buffer and a limiting amplifier. The DFE filter further comprises an automatic gain control circuit and a de-multiplexer.

DETAILED DESCRIPTION

A DFE filter architecture is typically composed of a decision circuit (slicer), which also samples the equalized analog signal, a delay-line providing "n" taps, and through tap-value scaling buffers, the delayed decisions produce post-cursor correction response at a summing point back before the slicer. An AGC ("Automatic Gain Control") before the DFE filter is needed to set the level.

Figure 1:
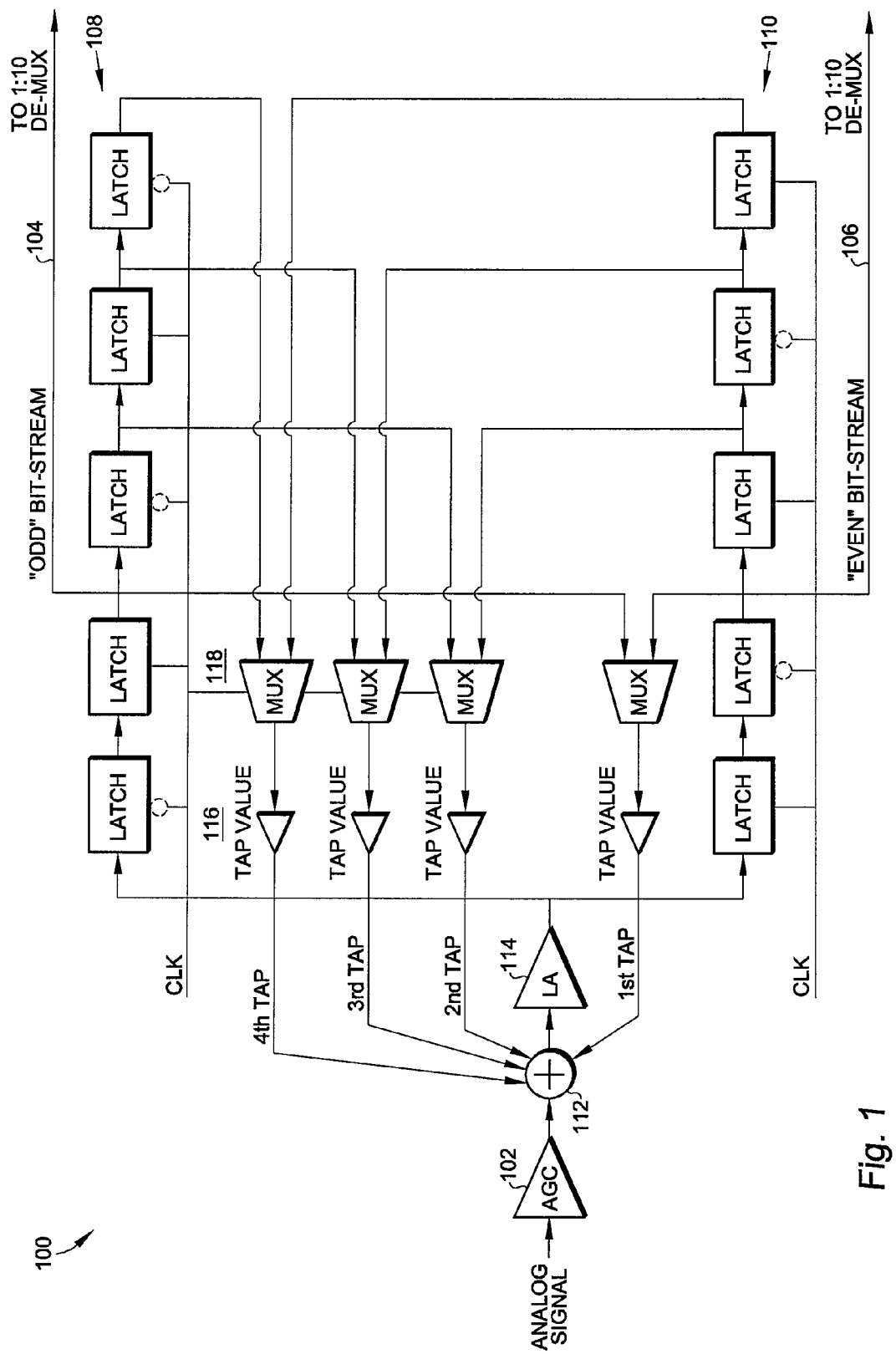
FIG. 1 is an embodiment of a DFE filter according to a first embodiment of the present invention.

The single-ended DFE filter architecture 100 shown in FIG. 1 has four taps 116 and can be used up to an operating frequency of 8.5 Gbps. The DFE filter architecture 100 has a four UI ("Unit Interval") long impulse response, and is a single-ended filtering scheme. The clock-recovery functionality of filter 100 is not shown.

Since the latch is the slowest element, two alternatively sampling at half of the bit-rate chains of latches 108 and 110 are used in filter 100. To produce the correction response of each tap the same sampling clock to drive a MUX 2:1 selector to feed-back at the summing point the corrections alternatively from each delay line was used. A summer 112 and multiplexing circuit 118 is shown in FIG. 1. The AGC 102 is also shown in FIG. 1 for receiving the analog input signal. The filter 100 provides an odd bit-stream 104 and an even bit-stream 106.

The decision-circuit was composed by a limiting amplifier 114 (LA) and sampling latch circuitry 108 and 110.

The well known limitation—the propagation and settling time of the first tap response of the filter to the input of the slicer should be within the tap unit interval (UI). This settling time has asymptotic minimum and limits the maximal data-rate.

The closed-loop topology has been already abandoned by others targeting operations at high data-rates due to inability to reduce the settling response of the contour of the filter.

An alternative open-loop architecture known as "look-forward" or "unrolled taps" has been used by others to break-through the above limitation. This type of architecture eliminates the settling process of the correction: there are different variants, but the concept could be described by the most common one: using $2^n$ slicers receiving simultaneously the incoming analog non-equalized signal, each one slicing with different static fixed offsets, which are all possible summary corrections from all sequences of n-bits. Here "n" is the length of the n-tap filter's response; the last sampled bits drive the selection of one from all slicers, which decision on the current bit has the corresponding level of summary correction offset contributed by all taps.

For example, for one post-cursor tap such solution would use two slicers, where each one adds a programmed tap-value of static offset, by the same absolute amount, with opposite +/− signs. This gives simultaneously the two possible corrections for the next sampling instance. Depending on the previous bit, the decision of one of the two slicers is being selected. For n-taps response this is equivalent to having a DAC with $2^n$ selectable levels, having zero settling time. However, for DFE with more than two taps the complexity rises rapidly with "n" rising. Increasing the data-rate complexity limits the length of the filter response. Solving these problems brings more complexity. This solution appears to be an asymptotically limited approach.

According to the present invention, an architecture for high data-rates is again a closed-loop topology of DFE filter, which shifts the data-rate limitation up taking advantage of the low complexity of the loop topology.

The number of building blocks in the proposed architecture does not double with adding a tap.

Figure 2:
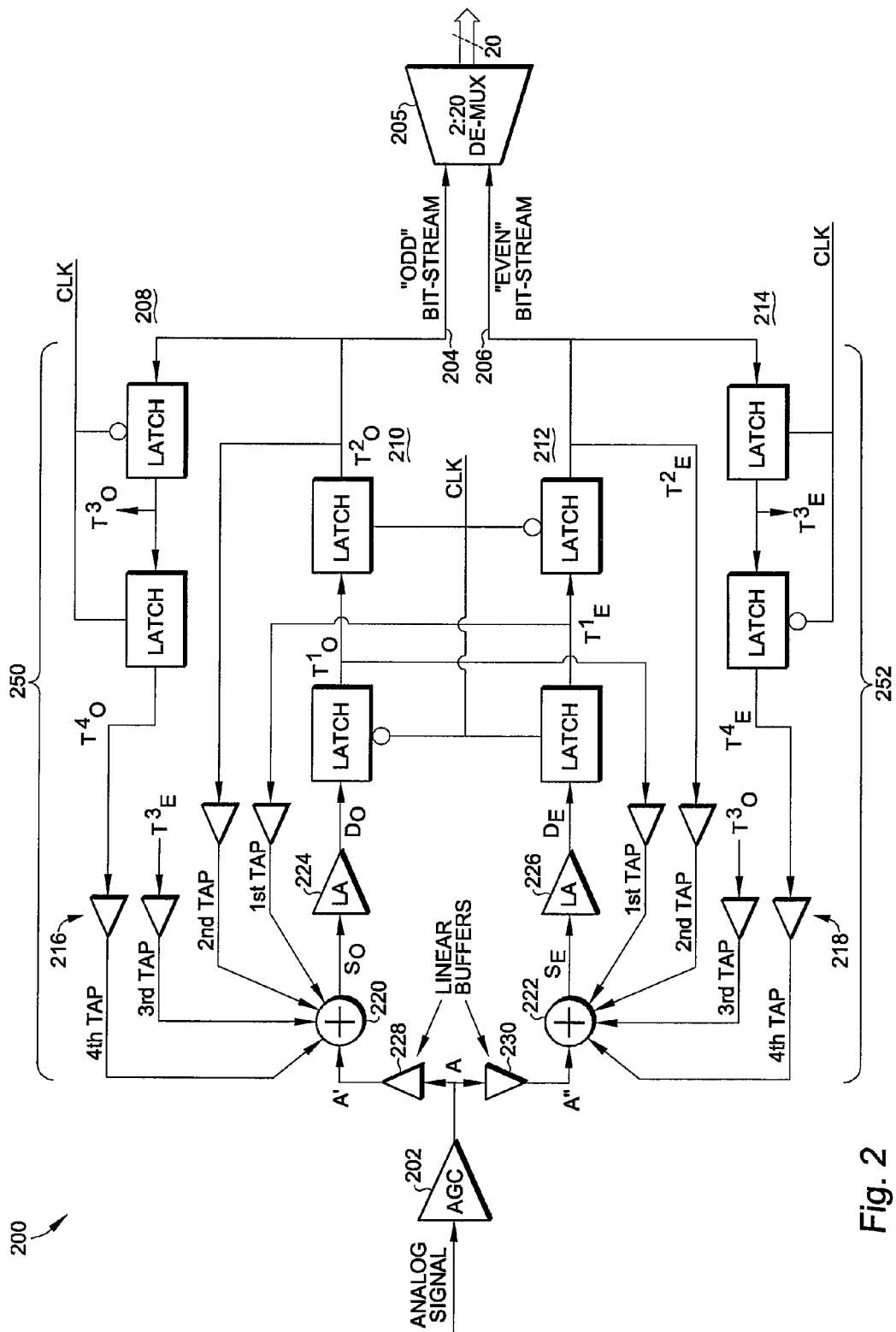
FIG. 2 is an embodiment of a DFE filter according to a second embodiment of the present invention.

The proposed DFE filter architecture 200 is shown in FIG. 2 and is based in part and an improvement upon, the DFE filter architecture 100 shown in FIG. 1.

The half-rate sampling by two flip-flops in parallel (208, 210 and 212, 214) at the half-rate sampling clock gives two times longer tolerance for the saturation of the output of the master-latch for the requirements of the slave-latch. This has been already exploited for de-multiplexing with slow sampling latches relative to the bit-rate. However, for the use of the sampled decisions for correcting the impulse response by a conventional DFE filter, the first tap correction settling does not have the two UI tolerances already described.

According to the present invention there is a desire to start the settling of the correction as early as possible. This drives to the attempts to skip the slave-latch in the sampling flip-flop and tap the first post-cursor tap from the master-latch output. However, the 2:1 multiplexer in the DFE first tap contour has only half a UI to settle after switching the selected input. This requires designing a MUX stage with two times wider bandwidth than the required for any stage in the RX analog signal path.

The proposed architecture according to the present invention has the property to hide the settling transition from the decision-circuit, like if the correction decision has infinite bandwidth.

The delay-lines for the filter in the proposed architecture are two in parallel as in our previous architecture. They are sampling at half-rate, and producing half-rate bit-sequences.

There are two parallel filter loops. There are two summers operating in parallel.

FIG. 1 shows the proposed four tap DFE architecture 200. Parallel feed-back loops with parallel summing are shown. The DFE architecture is drawn as a single-ended scheme. The clock-recovery functionality is not shown.

According to the present invention, a DFE filter 200 comprises an input (analog signal), a first filter loop 250 coupled to the input for providing an odd bit-stream 204, and a second filter loop 252 coupled to the input for providing an even bit-stream 206, wherein the first and second filter loops are substantially identical. The first filter loop 250 comprises a summer 220, a first latch circuit 210 coupled to the summer for providing the odd bit-stream 204, a second latch circuit 208 for receiving the odd bit-stream, and a delay circuit 216 coupled between the second latch circuit and the summer. The first filter loop 250 further comprises a linear buffer 228 and a limiting amplifier 224. The second filter loop 252 comprises a summer 222, a first latch circuit 212 coupled to the summer for providing the even bit-stream 206, a second latch circuit 214 for receiving the even bit-stream, and a delay circuit 218 coupled between the second latch circuit and the summer. The second filter loop 252 further comprises a linear buffer 230 and a limiting amplifier 226. The DFE filter 200 further comprises an automatic gain control circuit 202 and a de-multiplexer 205. The delay circuit 216 includes four taps as shown. The delay circuit 218 also includes four taps as shown. All four latch circuits 208, 210, 212, and 214 receive the CLK signal at inverted and non-inverted inputs thereof. Note that internal nodes of the DFE filter circuit are labeled $S_O$ and $D_O$ (for "odd") and $S_E$ and $D_E$ (for "even"). Similarly other internal nodes of the DFE filter circuit are labeled $T1_O$ through $T4_O$ (for "odd") and $T1_E$ through $T4_E$ (for "even"). Further note that the "T" nodes are interleaved or interconnected in FIG. 2.

Multiplexing operation is necessary to alternatively pick correction pulses for the same tap-delay from the two delay-lines sequentially. However, physical multiplexing blocks here are not needed. The multiplexing operation is performed by the sampling clock and the sampling latches. The removal of a multiplexing stage from the loop is not the main portion from the saving on timing in the proposed solution. This will become evident with the description of the multiplexing in the proposed architecture.

The taps with even numbers (2, 4, . . . ) organize closed-loops back to the summer before the slicer. The taps with odd numbers (1, 3, . . . ) create feed-forward paths instead of a feed-back paths: these connections go to the alternative summing channel of the filter.

For the critical contour of the first tap response, this architecture makes multiplexing between "odd" and "even" delay-lines by "sample-and-hold" functions with pair of latches. These are the front pair of latches, sampling the signals $D_O$ and $D_E$. They operate in parallel from the aspect of the incoming analog signal.

Both first tap contours connect this pair of latches in series, making full flip-flop. One of the latches is "master" in one of the contours and the same latch is "slave" in the other contour.

It is known that the timing margins of a two-way-switch (MUX 2:1) are half of that of a full flip-flop. Using two flip-flops for multiplexing provides extension on timing margins in this parallel feed-back, parallel summing DFE filter architecture.

Operation of the proposed filter architecture is now discussed. As required for any DFE filter the incoming analog signal passes through linear analog signal path. The dynamic range is regulated by AGC.

In the proposed architecture, the analog signal after the AGC is split into two copies. The impulse response correction processing on the analog signal is performed over both copies.

The sampling clock frequency is at the data-rate/2. The front latches pair samples alternatively the analog signal. After one more pair of latches, both half-rate bit-streams are being output from the filter for further de-multiplexing to parallel words. The filter uses the same latches as the delay-line for the first two taps and extends the delay-line to the desired number of taps.

One of the two summers output is being sampled only by the decision-circuit sampling the "odd" bits in the full-rate stream. This summer would be named "odd" summer. The other summer output is being sampled only by the decision circuit sampling the "even" bits in the full-rate stream. It would be named "even" summer.

There are two filter contours for each tap. Both contours operate in parallel.

The analog signals $S_O$ and $S_E$ have one common component. They are both propagated through the summer blocks from the AGC output. However, these two signals are different at any moment of time when the first tap coefficient of the DFE filter is different from zero. The architecture allows positive and negative coefficient values.

The inputs of the summers coming from the taps of the delay-lines have 2UI long cycles each, because the shift-rate in both delay-lines is at data-rate/2. Each one summer output is sampled only once in 2 bits-interval. This 2UI long timewindow is the tolerance given by this architecture for the feed-back path of the filter to finish its settling transition.

The correction specifically coming from the tap for the first post-cursor needs to be ready 1 UI after the cursor has been sampled. How this 2UI tolerance interval gives benefit for the first tap contour—the first tap correction is simply not delayed relative to the cursor. And it is extended for 1 UI more after the cursor:

The "odd" sampling latch is in transparent mode beginning from the center of the previous "even" bit. At the time when this latch transitions into "hold" state it samples the decision for the "odd" bit. Then it holds, extending that decision for 1UI to the center of the following "even" bit. The correction path started "predicting" the correction needed for the following "even" bit, when the "odd" path slicer was transitioning towards its decision for the "odd" bit". In fact, this is not a prediction, but a match following the on-going decision process in the slicer. At the moment of transition to "hold" state, the correction for the following bit is also a match of the just taken decision as it has been before that moment.

This 2UI early start of the post-cursor correction does not disturb the sampling of the cursor, because the settling transition of the first post-cursor correction is fed in the path of the opposite summer in the filter. Its slicer is not taking sample on the current bit. Both paths alternate their function on each bit-period and this process is driven by the sampling clock.

The two summers' outputs are settling towards independent different levels, having a difference in the fed-back bit-sequences. The sampling clock selects one of these summers alternatively, effectively the correction for the same common signal jumps from one level to a different level in zero time-interval. This is equivalent to a correction path with infinite bandwidth.

The other taps follow a full flip-flop and provide correction pulses, which are valid in 2UI long periods.

Properties of the proposed DFE architecture are now discussed.

The first tap has the exceptional property to make look-forward settling before the decision is taken.

The parallel processing technology of the proposed DFE filter hides the settling process of the correction from the decision circuit.

The jitter components on the sampling clock define not only the horizontal resolution and jitter-tolerance of the receiver in the non-trackable band of the CDR, but also affect the system impulse response of the DFE filter. The proposed architecture has the properties to hide part of the settling of the filter response, so it reduces the sensitivity of the filter response to the timing of the sampled decisions.

Limitations in the new DFE filter architecture are now discussed.

Splitting the analog signal in two copies makes considerations for layout floor-planning: it should consider keeping the same parasitic loading on both paths up to the first sampling latches for decently low skew between them.

The independent offsets in both slicers could be canceled independently. Outside the DFE filter as a stand-alone block design, from the system level of receiver channel aspects, there is the need to address the appearance of new parasitic interaction between the DFE filter and the clock-recovery functionality. The possibility for interaction appears due to the parallel summing and half-rate sampling does not require having a full-rate equalized signal at any physical point of the filter. In fact, only every "odd" eye is equalized in the "odd" sampling path and only every "even" eye is equalized in the "even" sampling path.

The clock-recovery observes the equalized signal in order to lock to its frequency and track its phase.

The RX clock-recovery could be implemented on two principles:
 1) Locking to and tracking the zero-crossings of the equalized signal and generating a sampling phase for the center of the bits, relative to the edge sampling phase;
 2) Locking to the median of interval with zero gradient of the equalized signal pulses—at the peak of the pulses.

The CDR in both cases would be affected in different ways by the new parallel operating DFE.

A clock-recovery based on the first locking criteria would be susceptible to the residual spread of zero-crossing trajectories in the interval preceding or following the valid frame interval of the "odd", respectively—"even" slicer.

The reason is that outside that "valid frame", the full-rate component in the signal with the high first tap coefficient through the early settling in the "non-valid" frame-time would produce early zero crossing somewhere in the non-valid frame, preceding the boundary of the two bits, where all the other frequency components in the equalized signal make their zero crossing.

This new interaction of DFE and CDR can be eliminated by limiting the bandwidth of the DFE's feed-back path settling response, specifying that the settling time should not get shorter than 1 UI.

Specifically, settling-time in more than 1UI and less than 2UI achieves the full ability of the DFE filter on data-recovery, while in this range the fed-back correction pulse does not pull the clock-recovery, even if the first tap value set nearly equal to the amplitude of the signal. This specification is for the DFE filter blocks design and does not change the specification of the clock-recovery functionality.

When the receiver should support multiple data-rates for backwards compatibility with link-partners operating at half data-rate, then the RX de-MUX could use only one half of the DFE, only one of the sampling channels. In that configuration the DFE filter is just the same as the trivial architecture.

A CDR based on the second locking criteria should not be influenced by the "out of frame" trajectories, because it is sampling completely inside the interval of equalized signal.

The proposed DFE filter architecture has the conditions to be applied with both groups of choices for clock-recovery.

Figure 3:
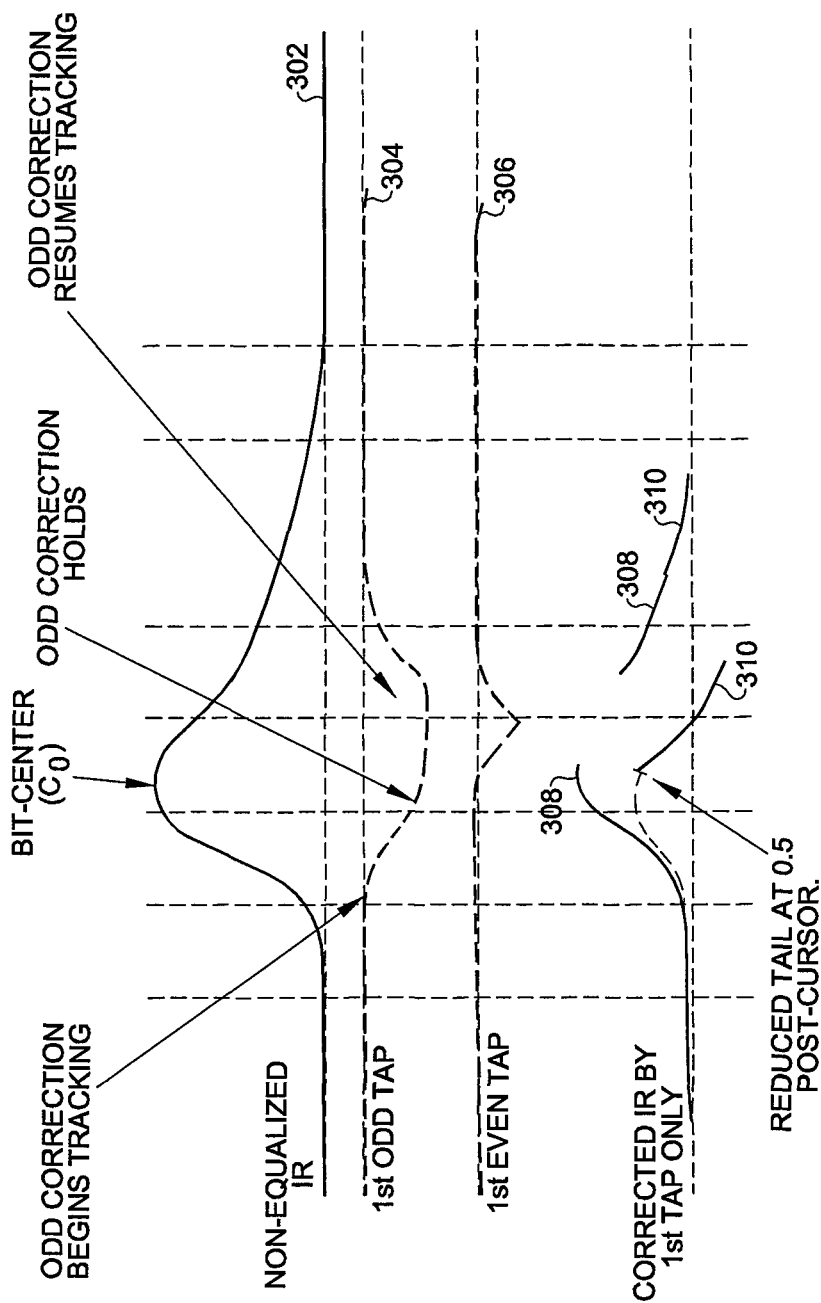
FIG. 3 is a plot of the impulse response of the DFE filter of FIG. 2.

Referring now to FIG. 3, where correction by the first-tap only, the mechanism of settling of the correction response of the filter architecture of FIG. 2 is shown. Trace 302 shows a typical non-equalized impulse response of media trace 304 shows correction response of first tap to the "even" summer, trace 306 shows correction response of first to the "odd" summer, trace 308 and 310 show the outputs of the "odd" and "even" summers. The alternating sampling of the two traces 310 and 308 makes effectively zero settling-time of the first tap response from the aspect of the "odd" and "even" slicers. Considering the sampling, effectively the DFE correction jumps to different level with no inertia by the selection of "odd" and "even" sampling channel, made by the sampling clock. An "infinite" band first tap response is shown in FIG. 3 by combining the "odd" and "even" summer's outputs as the sampling clock selects one of them in each bit-interval. In this example using 1 tap filter only both traces 308 and 310 are identical with the non-equalized trace after the first post-cursor interval.

Figure 4:
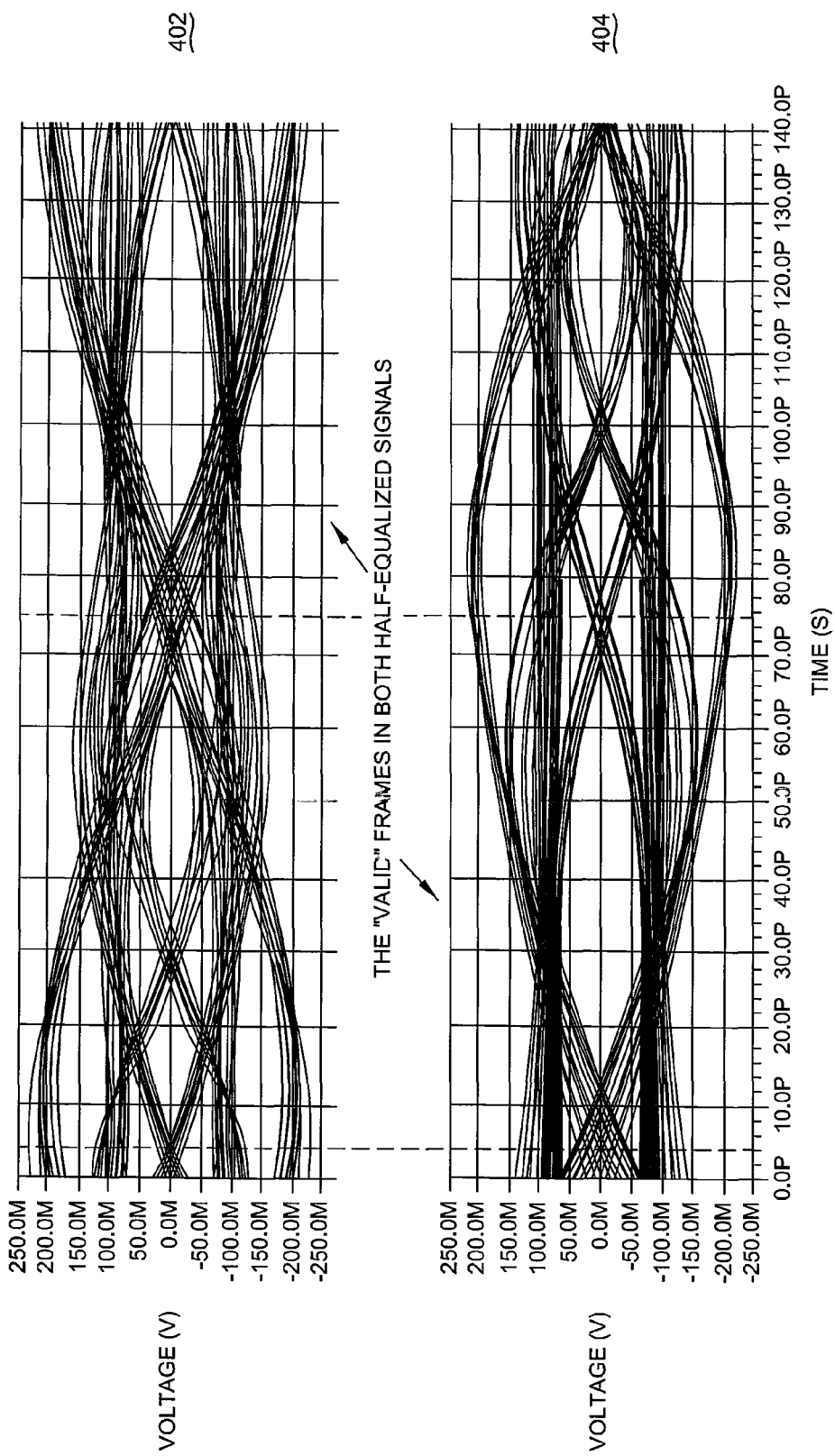
FIG. 4 is a plot of the outputs of the odd and even summers of the DFE filter of FIG. 2.

Referring now to FIG. 4, eye pattern 402 shows example of output waveform of "odd" summer and eye pattern 404 shows output waveform of "even summer" when media and all 4 taps coefficients are adapted. The eye-diagrams at outputs of the "odd" and "even" summers of the implemented DFE filter on simulation bench, equalizing the impulse response of media, presented by its S-parameters model, is shown in FIG. 4. FIG. 4 shows the property of obtaining half-rate equalized "frames" at the output of each summer of this operating at the data-rate/2 DFE filter. It can be seen in FIG. 4 that the band-limited signal-path makes the transition towards the corrected post-cursor level in the inactive frames, of each sampling channel, where the full-rate component is not equalized and where the settling transition of the first post cursor overlaps with the cursor.

Figure 5:
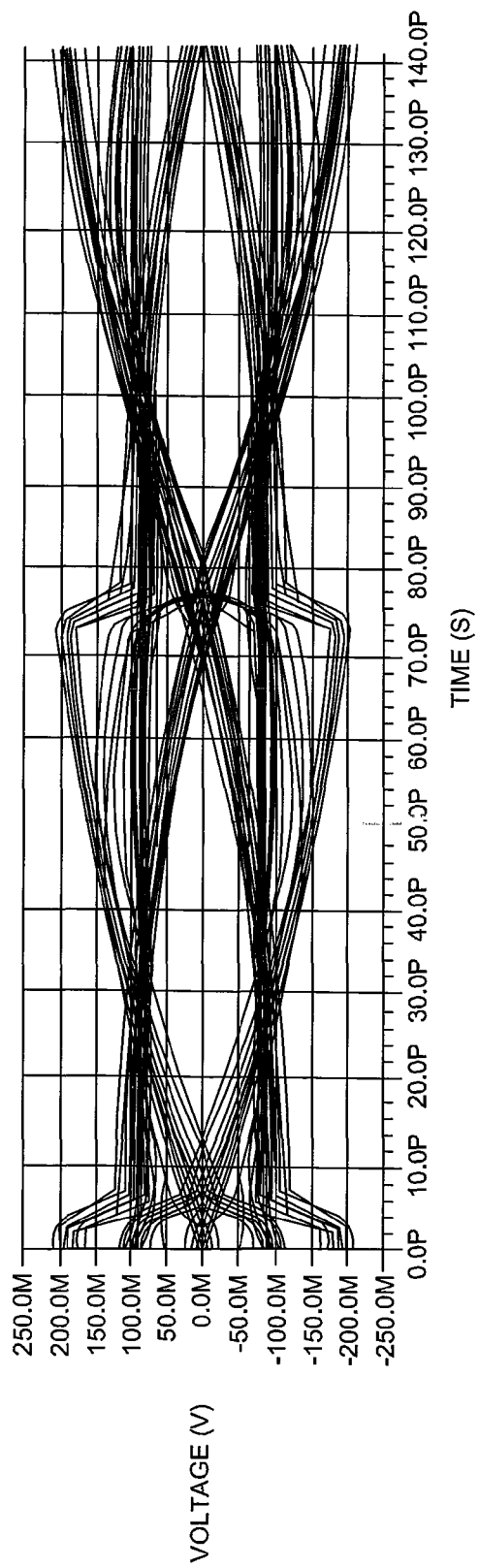
FIG. 5 is a plot of the virtually multiplexed to full-rate equalized output signal at 14 Gbps of the DFE filter of FIG. 2.

FIG. 5 shows the virtual full-rate signal, resulting from the combination of the "odd" and "even" frames of the sampling clock, acting alternatively on the wave-forms on FIG. 4. FIG. 4 shows the effective wave-form at input of the equivalent full-rate sampling circuit. FIG. 5 also shows that for the two samplers the excursions in the two separate summers, which pulse due to bandwidth limitation finishes within 2UI instead of 1, do not result in ISI, what would be the case without the advantage of the split loop and parallel summing, combined with the time multiplexing function of the half-rate sampling clock.

Although an embodiment of the present invention has been described for purposes of illustration, it should be understood that various changes, modifications and substitutions may be incorporated in the embodiment without departing from the spirit of the invention that is defined in the claims, which follow.

We claim:

1. A DFE filter comprising:
   an input;
   a first filter loop coupled to the input for providing an odd bit-stream;
   a second filter loop coupled to the input for providing an even bit-stream;
   a 2:20 de-multiplexer having a first input for receiving the odd bit-stream, a second input for receiving the even bit-stream, and an output bus for providing a plurality of outputs.

2. The DFE filter of claim 1 wherein the first and second filter loops are substantially identical and interleaved.

3. The DFE filter of claim 1 wherein the first filter loop comprises:
   a summer;
   a first latch circuit coupled to the summer for providing the odd bit-stream;
   a second latch circuit for receiving the odd bit-stream; and
   a delay circuit coupled between the second latch circuit and the summer.

4. The DFE filter of claim 3 wherein the summer comprises a five-input summer.

5. The DFE filter of claim 3 wherein the first latch circuit includes a clock input and an inverted clock input.

6. The DFE filter of claim 3 wherein the second latch circuit includes a clock input and an inverted clock input.

7. The DFE filter of claim 3 wherein the delay circuit comprises four taps.

8. The DFE filter of claim 3 wherein the first filter loop further comprises a linear buffer.

9. The DFE filter of claim 3 wherein the first filter loop further comprises a limiting amplifier.

10. The DFE filter of claim 1 wherein the second filter loop comprises:
    a summer;
    a first latch circuit coupled to the summer for providing the even bit-stream;
    a second latch circuit for receiving the even bit-stream; and
    a delay circuit coupled between the second latch circuit and the summer.

11. The DFE filter of claim 10 wherein the summer comprises a five-input summer.

12. The DFE filter of claim 10 wherein the first latch circuit includes a clock input and an inverted clock input.

13. The DFE filter of claim 10 wherein the second latch circuit includes a clock input and an inverted clock input.

14. The DFE filter of claim 10 wherein the delay circuit comprises four taps.

15. The DFE filter of claim 10 wherein the first filter loop further comprises a linear buffer.

16. The DFE filter of claim 10 wherein the first filter loop further comprises a limiting amplifier.

17. The DFE filter of claim 1 further comprising an automatic gain control circuit.

18. A DFE filter comprising:
    an input;
    a first filter loop including a multi-tap delay circuit coupled to the input for providing an odd bit-stream;
    a second filter loop coupled to the input for providing an even bit-stream; and
    a 2:20 de-multiplexer having a first input for receiving the odd bit-stream, a second input for receiving the even bit-stream, and an output bus for providing a plurality of outputs.

19. A DFE filter comprising:
    an input;
    a first filter loop coupled to the input for providing an odd bit-stream;
    a second filter loop including a multi-tap delay circuit coupled to the input for providing an even bit-stream; and
    a 2:20 de-multiplexer having a first input for receiving the odd bit-stream, a second input for receiving the even bit-stream, and an output bus for providing a plurality of outputs.

* * * * *